United States Patent
Zhang et al.

(10) Patent No.: US 12,098,320 B2
(45) Date of Patent: Sep. 24, 2024

(54) HEAT STORAGE COMPOSITE MATERIAL AND PREPARING METHOD THEREOF

(71) Applicant: AAC Technologies (Nanjing) Co., Ltd., Nanjing (CN)

(72) Inventors: Bo Zhang, Shenzhen (CN); Keqiang Xia, Shenzhen (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 242 days.

(21) Appl. No.: 17/839,499

(22) Filed: Jun. 14, 2022

(65) Prior Publication Data

US 2023/0220260 A1 Jul. 13, 2023

(30) Foreign Application Priority Data

Jan. 7, 2022 (CN) .......................... 202210016885.9

(51) Int. Cl.
| | |
|---|---|
| *F28F 13/00* | (2006.01) |
| *C08K 3/04* | (2006.01) |
| *C09K 5/06* | (2006.01) |
| *F28D 20/02* | (2006.01) |

(52) U.S. Cl.
CPC ................ *C09K 5/063* (2013.01); *C08K 3/04* (2013.01); *F28D 20/023* (2013.01); *C08K 2201/001* (2013.01)

(58) Field of Classification Search
CPC .... C09K 5/063; C08K 3/04; C08K 2201/001; F28D 20/023
USPC ......................................................... 165/146
See application file for complete search history.

(56) References Cited

U.S. PATENT DOCUMENTS

2013/0228308 A1* 9/2013 Abhari ...................... B29B 9/12
427/213

FOREIGN PATENT DOCUMENTS

| CN | 1754937 A | * | 4/2006 |
| CN | 108288739 A | * | 7/2018 |

* cited by examiner

*Primary Examiner* — Davis D Hwu
(74) *Attorney, Agent, or Firm* — W&G Law Group

(57) ABSTRACT

A heat storage composite material comprises components by weight: 30-55 parts of organic phase change material, 30-40 parts of two-dimensional thermally conductive carbon material, 10-20 parts of lamellar structure graphite, and 0-10 parts of oil-absorbing organic resin. A preparing method include steps of stirring the organic phase change material to disperse on a surface of the two-dimensional thermally conductive carbon material, and melting them so the organic phase-change material is adsorbed in gaps of the two-dimensional thermally conductive carbon material; stirring and mixing the lamellar structure graphite and the two-dimensional thermally conductive carbon material adsorbed with the organic phase change material in a mixer to obtain a mixed material; and placing the mixed material in a lamination mold for lamination treatment to obtain a sheet-shaped heat storage composite material. The heat storage composite material has high thermal conductivity and is not easy to leak.

9 Claims, 1 Drawing Sheet

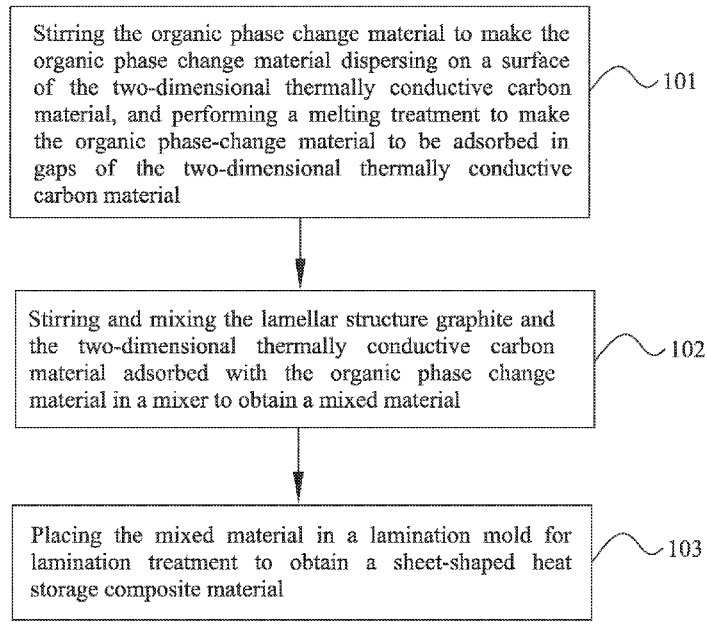

Stirring the organic phase change material to make the organic phase change material dispersing on a surface of the two-dimensional thermally conductive carbon material, and performing a melting treatment to make the organic phase-change material to be adsorbed in gaps of the two-dimensional thermally conductive carbon material ⎯ 101

Stirring and mixing the lamellar structure graphite and the two-dimensional thermally conductive carbon material adsorbed with the organic phase change material in a mixer to obtain a mixed material ⎯ 102

Placing the mixed material in a lamination mold for lamination treatment to obtain a sheet-shaped heat storage composite material ⎯ 103

HEAT STORAGE COMPOSITE MATERIAL AND PREPARING METHOD THEREOF

TECHNICAL FIELD

The present disclosure relates to a technical field of materials, and in particular to a heat storage composite material and a preparing method thereof

BACKGROUND

Heat storage design is one of important branches of a heat conduction scheme. Purpose of heat storage design is to conduct excess heat to a heat storage material and reduce overall temperature. Thermal conductivity of conventional heat storage material is on an order of 0.1 w/(m·k). Due to the low thermal conductivity of the conventional heat storage material, response time of the heat storage material to heat is too slow. For devices with high power and high heat generation, it is necessary to give priority to the heat dissipation materials used in the heat dissipation design. The heat storage material is only considered when thermal design is limited. When the heat storage material and heat dissipation materials are used together, there is competition between heat storage and heat dissipation, so application of the heat storage material is extremely limited.

A main solution of the heat storage design is to add thermally expanded graphite into the heat storage material. The thermally expanded graphite adsorbs the heat storage material and provides thermal conductivity. After adsorbing a large amount of the heat storage material, it is difficult to increase a thermal conductivity of the thermally expanded graphite to greater than 10 w/(m·k). Even if the thermally expanded graphite with high adsorption capacity is used, and is supplemented by high thermal conductivity two-dimensional carbon materials such as carbon nanotubes and graphene, it is still difficult to increase the thermal conductivity to greater than 10 w/(m·k). The reasons are random orientation of the small-sized two-dimensional carbon materials during a lamination process and accumulation of the heat storage material at contact points of the two-dimensional carbon materials, which lead to an increase in thermal resistance. Coupled with superposition of an extrusion effect after thermal expansion, conventional high thermal conductivity heat storage material is prone to leakage, so an anti-leakage device is required. Due to high lamination density, the conventional heat storage material with high thermal conductivity is mainly in a form of a block.

SUMMARY

A purpose of the present disclosure is to provide a heat storage composite material and a preparing method thereof, so as to solve a problem of low thermal conductivity of a conventional heat storage material, which easily leads to leakage of the heat storage material.

The present disclosure provides a heat storage composite material. The heat storage composite material comprises following components in proportion by weight: 30-55 parts of organic phase change material, 30-40 parts of two-dimensional thermally conductive carbon material, 10-20 parts of lamellar structure graphite, and 0-10 parts of oil-absorbing organic resin.

A particle size of the two-dimensional thermally conductive carbon material is less than 80 μm. A particle size of the lamellar structure graphite is in a range of 1-2 mm.

Furthermore, the organic phase change material comprises one or more of n-alkane C18-C22, paraffinic alkane C18-C30, and stearic acid C18-C22.

Furthermore, the two-dimensional thermally conductive carbon material comprises thermally expanded graphite, or mixture of the thermally expanded graphite and one or more of carbon nanotubes, single-layer graphene, and multi-layer graphene. A particle size of any one of the carbon nanotubes, the single-layer graphene and the multi-layer graphene is less than 30 μm.

Furthermore, the lamellar structure graphite comprises any one of thermally expanded graphite and flake graphite.

Furthermore, the oil-absorbing organic resin comprises any one of modified cellulose, acrylate resin, and olefin resin.

The present disclosure further provides a preparing method of the heat storage composite material mentioned above. The preparing method of the heat storage composite material comprises:

an adsorption treatment step: stirring the organic phase change material to make the organic phase change material dispersing on a surface of the two-dimensional thermally conductive carbon material, and performing a melting treatment to make the organic phase-change material to be adsorbed in gaps of the two-dimensional thermally conductive carbon material;

a mixing treatment step: stirring and mixing the lamellar structure graphite and the two-dimensional thermally conductive carbon material adsorbed with the organic phase change material in a mixer to obtain a mixed material; and a molding treatment step: placing the mixed material in a lamination mold for lamination treatment to obtain a sheet-shaped heat storage composite material.

Furthermore, the preparing method of the heat storage composite material further comprises a pulverizing and grinding treatment step. The pulverizing and grinding treatment step comprises pulverizing and grinding the organic phase change material, and pulverizing and grinding the oil-absorbing organic resin. The pulverizing and grinding treatment step is performed before the adsorption treatment step.

Furthermore, the mixing treatment step comprises stirring and mixing the oil-absorbing organic resin, the lamellar structure graphite, and the two-dimensional thermally conductive carbon material adsorbed with the organic phase change material in the mixer to obtain the mixed material.

Furthermore, during the melting treatment, a temperature is controlled in a range of 28-75° C., and the melting treatment is performed for 2-5 mins.

Furthermore, during the lamination treatment, a pressure is controlled in a range of 10-20 Mpa, and a temperature is controlled in a range of 40-70° C.

Furthermore, the preparing method of the heat storage composite material further comprises a calendering treatment step. The calendering treatment step comprises calendering the sheet-shaped heat storage composite material to obtain a film-shaped heat storage composite material.

The invention provides the heat storage composite material and a preparing method thereof. Basic components of the heat storage composite material comprise the organic phase change material, the small-sized two-dimensional thermally conductive carbon material and the large-sized lamellar structure graphite. The heat storage composite material is obtained through performing the adsorption treatment step, the mixing treatment step, and the molding treatment step. Compares with the prior art, in the present disclosure, since the small-sized two-dimensional thermally conductive carbon material has a large surface and a void structure between layers, it is easy to adsorb heat storage materials, so the small-sized two-dimensional thermally conductive carbon material is used as a skeleton for adsorbing the organic phase change material. Meanwhile, the large-size lamellar structure graphite acts as a thermal conduction channel, and the large-size lamellar structure graphite acts as a template for inducing alignment during the lamination treatment, and an orderly alignment occurs, so that the prepared heat storage composite material has high thermal conductivity and is less prone to leakage. In addition, the heat storage composite material comprises a small amount of oil-absorbing organic resin, which serves as a storage place for the heat storage composite material to overflow during a thermal expansion process, and improves processability of the heat storage composite material.

BRIEF DESCRIPTION OF DRAWINGS

FIG. 1 is a flow chart of a preparing method of a heat storage composite material of the present disclosure.

DETAILED DESCRIPTION

The present disclosure will be further described below with reference to the accompanying drawings and embodiments.

The present disclosure provides a heat storage composite material. The heat storage composite material comprises following components in proportion by weight: 30-55 parts of organic phase change material, 30-40 parts of two-dimensional thermally conductive carbon material, 10-20 parts of lamellar structure graphite, and 0-10 parts of oil-absorbing organic resin. A particle size of the two-dimensional thermally conductive carbon material is less than 80 μm. A particle size of the lamellar structure graphite is in a range of 1-2 mm.

The heat storage composite material comprises the organic phase change material, the two-dimensional thermally conductive carbon material and the lamellar structure graphite. By using the small-sized two-dimensional thermally conductive carbon material as a skeleton for adsorbing the organic phase change material and using the large-size lamellar structure graphite as a thermal conduction channel, during a lamination treatment, the large-size lamellar structure graphite acts as a template for inducing alignment and an orderly alignment occurs, so that the prepared heat storage composite material has high thermal conductivity and is less prone to leakage.

In some embodiments, the organic phase change material comprises one or more of n-alkane C18-C22, paraffinic alkane C18-C30, and stearic acid C18-C22. The organic phase change material has advantages of large latent heat of phase change, no supercolling, no corrosion, no volume effect, non-toxic and harmless, etc. In the embodiment, the organic phase change material is used as a heat storage material. By mixing one or more of n-alkane C18-C22, paraffinic alkane C18-C30, and stearic acid C18-C22, a melting range of the heat storage material is appropriately broadened, a drastic change in volume is avoided, and a change in volume during expansion of the heat storage material is further reduced. A melting point of the organic phase change material ranges from 28-75° C.

In some embodiments, the two-dimensional thermally conductive carbon material comprises thermally expanded graphite. The thermally expanded graphite has a stronger ability to improve thermal conductivity of the heat storage material than ordinary graphite. In some relevant experimental data, by adding 16% of ordinary graphite, the thermal conductivity of the heat storage material is increased by 67.74%, while by adding 1% of the thermally expanded graphite, the thermal conductivity of the heat storage material is increased by 87.1%. The thermally expanded graphite is an excellent adsorbent. The thermally expanded graphite has a loose porous structure and has a strong adsorption capacity for organic compounds. Therefore, in the embodiment, the thermally expanded graphite is configured for adsorbing the organic phase change material. In the embodiment, the thermally expanded graphite is a particle thermally expanded graphite with a particle size of the micron level, a specification of the thermally expanded graphite is about 300 mesh, and a particle size of the thermally expanded graphite is no more than 80 μm.

In some embodiments, the two-dimensional thermally conductive carbon material comprises mixture of the thermally expanded graphite and one or more of carbon nanotubes, single-layer graphene, and multi-layer graphene. High thermal conductivity fillers such as the carbon nanotubes, the single-layer graphene, and the multi-layer graphene are mixed with the small-sized thermally expanded graphite to further improve the thermal conductivity. The carbon nanotubes, the single-layer graphene, and the multi-layer graphene are with a particle size of the micron level. A particle size of any one of the carbon nanotubes, the single-layer graphene, and the multi-layer graphene is less than 30 μm.

In some embodiments, the lamellar structure graphite comprises any one of the thermally expanded graphite and flake graphite. A particle size of the thermally expanded graphite and the flake graphite is in the order of millimeters and is in a range of 1-2 mm. The thermally expanded graphite and the flake graphite is instantly expanded in volume when exposed to high temperature, and is changed from flakes to worms. As a result, a structure of the lamellar structure graphite is loose, porous and curved, a surface area of the lamellar structure graphite is increased, the surface energy is increased, and adsorption force is enhanced. In the embodiment, the large-size lamellar structure graphite acts as a template for inducing alignment. After the lamination treatment, the lamellar structure graphite is arranged in an orderly orientation, so the lamellar structure graphite is used as a thermal conduction channel of the heat storage composite material.

In some embodiments, the oil-absorbing organic resin comprises any one of modified cellulose, acrylate resin, and olefin resin. The oil-absorbing organic resin is used as a binder and an adsorption supplement for thermal expansion of the heat storage material, and as a plasticizer and a flexibility agent in the lamination treatment, which improves the processability of the heat storage composite material and facilitates formation of heat storage composite material into a sheet or a film.

The present disclosure further provides a preparing method of the heat storage composite material mentioned above. As shown in FIG. 1, a flow chart of the preparing method of the heat storage composite material, the preparing method of the heat storage composite material comprises:

an adsorption treatment step 101: stirring the organic phase change material to make the organic phase change material dispersing on a surface of the two-dimensional thermally conductive carbon material, and performing a melting treatment to make the organic phase-change material to be adsorbed in gaps of the two-dimensional thermally conductive carbon material;

Before stirring the organic phase change material to make the organic phase change material dispersing on the surface of the two-dimensional thermally conductive carbon material, the organic phase change material needs to be pulverized and ground. For conventional organic phase change materials, a particle size is relatively large. By pulverization and grinding, powder of the organic phase change material with small particle size is obtained, which is easy to be fully mixed with the two-dimensional thermally conductive carbon material. Optionally, the organic phase change material is placed in a ball mill and is pulverized at a rotating speed of 200 r/min for 2 hours to obtain the powder of the organic phase change material with a particle size of 10-20 μm.

Then, the powder of the organic phase change material is melted at a temperature of 28-75° C., so that the powder of the organic phase change material is adsorbed into the gaps of the two-dimensional thermally conductive carbon material.

a mixing treatment step 102: stirring and mixing the lamellar structure graphite and the two-dimensional thermally conductive carbon material adsorbed with the organic phase change material in a mixer to obtain a mixed material;

In some embodiments, when performing the mixing treatment, the oil-absorbing organic resin is stirred and mixed with the lamellar structure graphite and the two-dimensional thermally conductive carbon material adsorbed with the organic phase change material in the mixer to obtain the mixed material.

When the oil-absorbing organic resin is added in the mixing treatment step, the oil-absorbing organic resin is also necessary to be placed in the ball mill for pulverization and grinding. Optionally, the oil-absorbing organic resin is pulverized at a rotating speed of 150 r/min for 1.5 hours to obtain powder of the oil-absorbing organic resin with a particle size of 5-20 μm.

In addition, the oil-absorbing organic resin is mixed with the lamellar structure graphite before mixed with other components to obtain the mixed material, or the oil-absorbing organic resin is mixed with the two-dimensional thermally conductive carbon material before mixed with other components to obtain the mixed material. It should be noted that no matter which mixing method is performed, the oil-absorbing organic resin needs to be mixed after the adsorption treatment step, so as to prevent pre-mixing of the oil-absorbing organic resin from affecting improvement of the thermal conductivity.

a molding treatment step 103: placing the mixed material in a lamination mold for lamination treatment to obtain a sheet-shaped heat storage composite material.

The lamination treatment, also known as lamination molding method, refers to a molding processing method that combines multiple layers of same or different materials as a whole under heating and pressure. The fully mixed mixed material is placed in the laminated mold and is laminated under certain conditions to obtain the sheet-shaped heat storage composite material.

During the lamination treatment, the large-sized lamellar structure graphite is arranged in an orderly orientation. The large-sized lamellar structure graphite is used as the thermal conduction channel of the heat storage composite material, and the small-sized two-dimensional thermally conductive carbon material is used as the adsorption site of the organic phase change material, so that the prepared heat storage composite material has characteristics of high thermal conductivity, and prevents the occurrence of leakage during a phase change process.

Furthermore, after the lamination treatment, a calendering treatment is performed on the sheet-shaped heat storage composite material to obtain a film-shaped heat storage composite material. During the calendering treatment, the large-sized lamellar structure graphite moves horizontally, which further improves horizontal and vertical thermal conductivity of the heat storage composite material.

In some embodiments, during the melting treatment, a temperature is controlled in a range of 28-75° C., and the melting treatment is performed for 2-5 mins.

In some embodiments, during the lamination treatment, a pressure is controlled in a range of 10-20 Mpa, and a temperature is controlled in a range of 40-70° C.

The present disclosure is further described below in conjunction with specific embodiments and a comparative Embodiment.

Embodiment 1

1. 50 parts of paraffin are pulverized and ground to obtain paraffin powder with a particle size of 10 μm; and 5 parts of modified cellulose are pulverized and ground to obtain modified cellulose powder with a particle size of 5 μm.
2. The paraffin powder is mixed with 30 parts of the thermally expanded graphite with a specification of 200 mesh. After stirring, the paraffin powder is dispersed on a surface of the thermally expanded graphite, and then they are melted at a temperature of 55° C., so that the paraffin powder is adsorbed into the gaps of layers of the thermally expanded graphite.
3. The thermally expanded graphite adsorbed with the paraffin powder is mixed with the modified cellulose powder and 15 parts of flake graphite KP100 with a specification of 200 mesh, and is stirred evenly to obtain the mixed material. The flake graphite KP100 needs to undergo thermal expansion treatment to form vermicular graphite.
4. The mixed material is put into the lamination mold, and the mixed material is pressed into the sheet-shaped heat storage composite material under a pressure of 10 Mpa and a temperature of 48° C.
5. The sheet-shaped heat storage composite material is further calendered to obtain the film-shaped heat storage composite material.

Embodiment 2

1. 30 parts of the paraffin are pulverized and ground to obtain the paraffin powder with a particle size of 10 μm; and 10 parts of modified cellulose are pulverized and ground to obtain the modified cellulose powder with the particle size of 5 μm.
2. The paraffin powder is mixed with 40 parts of the thermally expanded graphite with a specification of 300 mesh. After stirring, the paraffin powder is dispersed on the surface of the thermally expanded graphite, and then they are melted at a temperature of 55° C., so that the paraffin powder is adsorbed into the gaps of layers of the thermally expanded graphite.
3. The thermally expanded graphite adsorbed with the paraffin powder is mixed with the modified cellulose powder and 10 parts of the flake graphite KP100 with the specification of 200 mesh, and is stirred evenly to obtain the mixed material. The flake graphite KP100 needs to undergo thermal expansion treatment to form vermicular graphite.

4. The mixed material is put into the lamination mold, and the mixed material is pressed into the sheet-shaped heat storage composite material under the pressure of 10 Mpa and the temperature of 48° C.
5. The sheet-shaped heat storage composite material is further calendered to obtain the film-shaped heat storage composite material.

Embodiment 3

1. 40 parts of the paraffin and 10 parts of the stearic fatty acid are mixed and are pulverized and ground to obtain mixed powder with a particle size of 10 μm; and 10 parts of modified cellulose are pulverized and ground to obtain the modified cellulose powder with the particle size of 5 μm.
2. The mixed powder is mixed with 30 parts of the thermally expanded graphite with the specification of 200 mesh. After stirring, the mixed powder is dispersed on the surface of the thermally expanded graphite, and then they are melted at a temperature of 55° C., so that the mixed powder is adsorbed into the gaps of layers of the thermally expanded graphite.
3. The thermally expanded graphite adsorbed with the mixed powder is mixed with the modified cellulose powder and 15 parts of the flake graphite KP100 with the specification of 200 mesh, and is stirred evenly to obtain the mixed material. The flake graphite KP100 needs to undergo thermal expansion treatment to form vermicular graphite.
4. The mixed material is put into the lamination mold, and the mixed material is pressed into the sheet-shaped heat storage composite material under the pressure of 10 Mpa and the temperature of 48° C.
5. The sheet-shaped heat storage composite material is further calendered to obtain the film-shaped heat storage composite material.

Embodiment 4

1. 50 parts of the paraffin are pulverized and ground to obtain the paraffin powder with the particle size of 10 μm.
2. The paraffin powder is mixed with 35 parts of the thermally expanded graphite with the specification of 200 mesh. After stirring, the paraffin powder is dispersed on the surface of the thermally expanded graphite, and then they are melted at a temperature of 55° C., so that the paraffin powder is adsorbed into the gaps of layers of the thermally expanded graphite.
3. The thermally expanded graphite adsorbed with the paraffin powder is mixed with 15 parts of the flake graphite KP100 with the specification of 200 mesh, and is stirred evenly to obtain the mixed material. The flake graphite KP100 needs to undergo thermal expansion treatment to form vermicular graphite.
4. The mixed material is put into the lamination mold, and the mixed material is pressed into the sheet-shaped heat storage composite material under the pressure of 10 Mpa and the temperature of 48° C.
5. The sheet-shaped heat storage composite material is further calendered to obtain the film-shaped heat storage composite material.

Embodiment 5

1. 30 parts of the paraffin are pulverized and ground to obtain the paraffin powder with the particle size of 10 μm; and 10 parts of modified cellulose are pulverized and ground to obtain the modified cellulose powder with the particle size of 5 μm.
2. The paraffin powder is mixed with 10 parts of the multi-layer graphene with a particle size of 20 μm. After stirring, the paraffin powder is dispersed on the surfaces of the thermally expanded graphite and the multi-layer graphene, and then they are melted at a temperature of 55° C., so that the paraffin powder is adsorbed into the gaps of layers of the thermally expanded graphite and the multi-layer graphene.
3. The thermally expanded graphite and multi-layer graphene adsorbed with the paraffin powder is mixed with the modified cellulose powder and 20 parts of 100 mesh flake graphite KP100, and is stirred evenly to obtain the mixed material. The flake graphite KP100 with the specification of 200 mesh needs to undergo thermal expansion treatment to form vermicular graphite.
4. The mixed material is put into the lamination mold, and the mixed material is pressed into the sheet-shaped heat storage composite material under the pressure of 10 Mpa and the temperature of 48° C.
5. The sheet-shaped heat storage composite material is further calendered to obtain the film-shaped heat storage composite material.

Embodiment 6

1. 50 parts of the paraffin are pulverized and ground to obtain paraffin powder with the particle size of 10 μm; and 5 parts of the modified cellulose are pulverized and ground to obtain modified cellulose powder with the particle size of 5 μm.
2. The paraffin powder is mixed with 30 parts of the thermally expanded graphite with the specification of 200 mesh. After stirring, the paraffin powder is dispersed on the surface of the thermally expanded graphite, and then they are melted at a temperature of 55° C., so that the paraffin powder is adsorbed into the gaps of layers of the thermally expanded graphite.
3. The thermally expanded graphite adsorbed with the paraffin powder is mixed with the modified cellulose powder and 15 parts of the flake graphite KP100 with the specification of 200 mesh, and is stirred evenly to obtain the mixed material.
4. The mixed material is put into the lamination mold, and the mixed material is pressed into the sheet-shaped heat storage composite material under the pressure of 10 Mpa and the temperature of 48° C.

Embodiment 7

1. 55 parts of the paraffin are pulverized and ground to obtain the paraffin powder with the particle size in a range of 10-20 μm.
2. The paraffin powder is mixed with 45 parts of the thermally expanded graphite with the specification of 200 mesh. After stirring, the paraffin powder is dispersed on the surface of the thermally expanded graphite, and then they are melted at a temperature of 55° C., so that the paraffin powder is adsorbed into the gaps of layers of the thermally expanded graphite to obtain the mixed material.
3. The mixed material is put into the lamination mold, and the mixed material is pressed into the sheet-shaped heat storage composite material under the pressure of 10 Mpa and the temperature of 48° C.

The heat storage composite material prepared in the above embodiments is subjected to thermal conductivity tests and 5-10 anti-leakage tests are performed at a temperature of −10-60° C. Test results are shown in Table 1.

TABLE 1

(Properties of the Heat Storage Composite materials)

| Embodiment | Thermal conductivity w/(m · k) | anti-leakage test result |
|---|---|---|
| 1 | 26.2 | Qualified |
| 2 | 28.1 | Qualified |
| 3 | 25.4 | Qualified |
| 4 | 26.4 | Qualified |
| 5 | 28.5 | Qualified |
| 6 | 22.7 | Qualified |
| 7 | 7.3 | Unqualified |
| Blank (not processed) | / | / |

Among them, Embodiment 1 is compared with Embodiment 2, and Embodiment 1 is compared with Embodiment 3, it is indicated that an amount of the organic phase change material is reduced and an amounts of the small-sized two-dimensional thermally conductive carbon material or an amounts of the large-sized flake graphite is increased. With the increase of the two-dimensional thermally conductive carbon material or the large-sized flake graphite, the thermal conductivity of the heat storage composite material prepared is relatively improved.

Compared with Embodiment 1, no oil-absorbing organic resin is added in Embodiment 4, and in the thermal conductivity results shown in Table 1, the thermal conductivity of Embodiment 4 does not have a big difference with that of the Embodiment 1. Therefore, addition of the oil-absorbing organic resin has little effect on the preparation of the heat storage composite material of the present disclosure.

Compared with Embodiment 1, the two-dimensional thermally conductive carbon material in Embodiment 5 comprises the multi-layer graphene and the thermally expanded graphite. Based on high thermal conductivity of graphene, the thermal conductivity of the heat storage composite material prepared in Embodiment 5 is relatively increased.

Compared with Embodiments 1-5, in Embodiment 6, the sheet-shaped heat storage composite material is not calendered, and the thermal conductivity thereof is much less than that the thermal conductivity of the heat storage composite material in Embodiments 1-5. However, the thermal conductivity of the sheet-shaped heat storage composite material in Embodiment 6 is still greater than 20 w/(m·k).

Embodiment 7 is a comparative Embodiment of Embodiments 1-6. In Embodiment 7, small-sized thermally expanded graphite filled with organic phase change material is adopted. The thermal conductivity of the heat storage composite material in Embodiment 7 is obviously different from that of the technical scheme proposed by the present disclosure. Moreover, the anti-leakage test result is unqualified.

The above are only optional embodiments of the present disclosure, it should be pointed out that for those of ordinary skill in the art, improvements can be made without departing from the inventive concept of the present disclosure, which should all fall within the protection scope of the present disclosure.

What is claimed is:

1. A heat storage composite material, comprising following components in proportion by weight:

30-55 parts of organic phase change material;
30-40 parts of two-dimensional thermally conductive carbon material including mixture of thermally expanded graphite and one or more of carbon nanotubes, single-layer graphene, and multi-layer graphene; a particle size of any one of the carbon nanotubes, the single-layer graphene, and the multi-layer graphene is less than 30 μm;
10-20 parts of lamellar structure graphite including any one of thermally expanded graphite and flake graphite; and
0-10 parts of oil-absorbing organic resin;
wherein a particle size of the thermally expanded graphite in the two-dimensional thermally conductive carbon material is less than 80 μm; a particle size of the lamellar structure graphite is in a range of 1-2 mm.

2. The heat storage composite material according to claim 1, wherein the organic phase change material comprises one or more of n-alkane C18-C22, paraffinic alkane C18-C30, and stearic acid C18-C22.

3. The heat storage composite material according to claim 1, wherein the oil-absorbing organic resin comprises any one of modified cellulose, acrylate resin, and olefin resin.

4. A preparing method of the heat storage composite material according to claim 1, comprising steps:

an adsorption treatment step: stirring the organic phase change material to make the organic phase change material dispersing on a surface of the two-dimensional thermally conductive carbon material, and performing a melting treatment to make the organic phase-change material to be adsorbed in gaps of the two-dimensional thermally conductive carbon material;
a mixing treatment step: stirring and mixing the lamellar structure graphite and the two-dimensional thermally conductive carbon material adsorbed with the organic phase change material in a mixer to obtain a mixed material; and
a molding treatment step: placing the mixed material in a lamination mold for lamination treatment to obtain a sheet-shaped heat storage composite material.

5. The preparing method of the heat storage composite material according to claim 4, wherein further comprises a pulverizing and grinding treatment step; the pulverizing and grinding treatment step comprises pulverizing and grinding the organic phase change material, and pulverizing and grinding the oil-absorbing organic resin; wherein the pulverizing and grinding treatment step is performed before the adsorption treatment step.

6. The preparing method of the heat storage composite material according to claim 5, wherein the mixing treatment step comprises stirring and mixing the oil-absorbing organic resin, the lamellar structure graphite, and the two-dimensional thermally conductive carbon material adsorbed with the organic phase change material in the mixer to obtain the mixed material.

7. The preparing method of the heat storage composite material according to claim 4, wherein during the melting treatment, a temperature is controlled in a range of 28-75° C., and the melting treatment is performed for 2-5mins.

8. The preparing method of the heat storage composite material according to claim 4, wherein during the lamination treatment, a pressure is controlled in a range of 10-20 Mpa, and a temperature is controlled in a range of 40-70° C.

9. The preparing method of the heat storage composite material according to claim 4, wherein further comprises a calendering treatment step; the calendering treatment step comprises calendering the sheet-shaped heat storage composite material to obtain a film-shaped heat storage composite material.

\* \* \* \* \*